3,258,395
TETRAKIS ALKYLAMINE METAL HALIDE AS AN ANIMAL REPELLENT
William J. Shibe, Jr., Riverton, N.J., assignor to R. M. Hollingshead, Camden, N.J., a corporation of New Jersey
No Drawing. Filed Feb. 6, 1963, Ser. No. 256,557
6 Claims. (Cl. 167—46)

This invention relates to a method of rendering a location resistant to damage by animals, and to a chemically treated barrier for providing such protection. More particularly, this invention relates to the provision of a barrier which carries a gustatory repellent which serves to discourage mice, rats, rabbits and even larger animals such as deer and the like from biting or chewing the barrier for the purpose of penetration.

This invention has particular utility in a wide variety of applications. For example, various rodents have been troublesome because of repeated damage to corn in corn cribs, silos and the like, and conventional repellents have exhibited the disadvantages of inadequate repellency, high cost, and difficulty of application without concurrent damage to the corn. In accordance with this invention, the gustatory repellent is conveniently and inexpensively applied by simply erecting a barrier around the lower portion of the corn crib, such barrier containing the gustatory repellent.

Similarly, low growing crops such as rice crops and the like have been subject to widespread damage due to animals and crops of this nature have been especially difficult to protect. However, according to this invention a barrier is simply erected around the crops to be protected, such barrier containing the gustatory repellent referred to hereinafter.

Barriers in accordance with this invention are similarly applied for the protection of trees, particularly in the winter time, ornamentals, and even for seeds by providing a barrier around the entire surface of such seed, or by providing containers for the seeds, which containers themselves constitute the protective barrier.

Accordingly, an object of this invention is to provide a barrier rendering a location resistant to damage by animals, which is inexpensive and not difficult to apply, and which is reliable in giving the protection desired.

Another problem confronting those who attempt to use gustatory repellents in the outdoors is the problem of gradual leaching by natural rainfall. While most gustatory repellents are reliant upon their water solubility for activity, this same water solubility subjects the chemical to serious losses due to natural rainfall. Accordingly, a further object of this invention is to provide a barrier for animal protection which contains a water soluble gustatory repellent which is nevertheless resistant to losses due to natural rainfall.

Other objects and advantages of this invention will further become apparent hereinafter.

In accordance with this invention, it has been found that excellent animal repellent results are obtained by erecting a barrier through which the animals must pass, and by applying to the surface of such barrier a gustatory repellent consisting of tetrakis alkylamine metal halide, having the generic formula $(RNH_2)_4MX_3$ where the metal M is selected from the group consisting of nickel, zinc, boron and aluminum, the alkyl group R contains from 8 to 18 carbon atoms and the halide X is selected from the group consisting of bromine and chlorine.

Specific examples of compounds for application to a barrier in accordance with this invention are:

Tetrakis dodecylamine boronium chloride
Tetrakis myristylamine boronium chloride
Tetrakis hexadecylamine boronium chloride
Tetrakis octadecylamine boronium chloride
Tetrakis (2-ethylhexylammino)-boronium chloride
Tetrakis dodecylamine aluminum chloride
Tetrakis myristylamine aluminum chloride
Tetrakis hexadecylamine aluminum chloride
Tetrakis octadecylamine aluminum chloride
Tetrakis (2-ethylhexylammino)-aluminum chloride
Tetrakis dodecylamine nickel chloride
Tetrakis myristylamine nickel chloride
Tetrakis hexadecylamine nickel chloride
Tetrakis octadecylamine nickel chloride
Tetrakis (2-ethylhexylammino)-nickel chloride
Tetrakis dodecylamine zinc chloride
Tetrakis myristylamine zinc chloride
Tetrakis hexadecylamine zinc chloride
Tetrakis octadecylamine zinc chloride
Tetrakis (2-ethylhexylammino)-zinc chloride and the corresponding bromine compounds.

Surprisingly, compounds containing less than 8 carbon atoms in the alkyl group have been found to have inferior repellency, and those containing above 18 carbon atoms are also inadequate from the point of view of potency.

While all of the above identified compounds are sufficiently water soluble to provide exceedingly great gustatory repellent potency, they are not poisons and when taken internally their toxicity is approximately that of common table salt. Apparently the repellency is caused by taste and not because of odor or toxicity.

Preferably, the barrier in accordance with this invention is created by providing a cloth, such as woven cotton cloth, burlap, canvas or any other fabric, and by applying a solution of the animal repellent chemical to the cloth. When thus applied, the preferred concentration of tetrakis alkylamine metal chloride is about 10 to 100 milligrams per square inch of fabric.

Preferably, the chemical is contained in water in the presence of a polysaccharide binder selected from the group consisting of starch, cellulose methyl ether, hydroxyethyl cellulose and carboxymethyl cellulose. Other suitable binders are cationically emulsified polyethylene emulsion, polyvinyl alcohol, casein, tragacanth, acrylic polymers cationically polymerized, vinyl acetate polymers cationically polymerized, and the like. The binders referred to above, and their equivalents, are of advantage in that they retard dissolution of the gustatory repellent in natural rainfall, ground moisture or other moisture.

Compounds of the type referred to herein are disclosed in the patent to Sowa No. 2,655,524, granted October 13, 1953. However, as heretofore indicated, when the alkyl group contains 8 or 10 carbon atoms, the compound does not have sufficient potency in accordance with this invention. Moreover, the Sowa patent discloses fluorides and iodides which have also been found to have inadequate potency and therefore are unsuitable for purposes of this invention. Moreover, similar comments apply to the alkenyl and the alkadienyl radicals and to the cyclohexyl radical, the phenyl radical and the benzyl radical.

Methods of preparation of the compounds in accordance with this invention are essentially as disclosed in the Sowa patent, the disclosure of which is incorporated herein by reference.

*Example 1*

Tests were run to determine the degree of repellency of tetrakis laurylammino boronium chloride to invasion of burlap bags by house mice (*mus musculus*). Each burlap bag contained food and was sealed, and was exposed for an overnight exposure period of 16 to 18 hours to an individual mouse which had been taught to penetrate untreated burlap bags in order to reach the food. In each test, the bag was deemed penetrated when the hole was sufficiently large for the test animal to obtain the food.

In each case, the tetrakis laurylamine boronium chloride was applied to the burlap in known quantity (milligrams per square inch of burlap surface) from an aqueous solution. In all cases, the bag was saturated with the solution.

The following results were obtained:

| Concentration on burlap bags (10 oz. weight) (milligrams per square inch) | Number Tested | Number Repelled |
|---|---|---|
| 10.0 | 10 | 0 |
| 17.8 | 10 | 4 |
| 31.7 | 10 | 6 |
| 46.6 | 10 | 10 |

Based upon the above results, and determining concentration-repellent effect from the method of Litchfield and Willcoxon (J. Pharm. and Exp. Therap., 96, 99, 1949), the following values were obtained:

$R_{50}$ ---------------- 23.8    $R_{90}$ ---------------- 44
$R_{80}$ ---------------- 35.5    $R_{99}$ ---------------- 73

The expression "$R_{50}$" designates the chemical concentration on the barrier which is required to repel 50% of the animals tested, and a similar connotation applies to the expressions "$R_{80}$," "$R_{99}$," etc.

*Example 2*

Utilizing the procedures set forth above in connection with house mice, the same barrier was tested against Norway rats. It was found that 43.5 milligrams per square inch repelled 50% of the test animals, 54 milligrams per square inch repelled 80% of the test animals, and 80 milligrams per square inch repelled 99% of the test animals.

*Example 3*

Utilizing the procedures set forth above and the same barrier but testing against white mice, the following results were found:

| $R^{50}$ | $R^{10}$ | $R^{99}$ |
|---|---|---|
| 3.7 | 6.5 | 11.6 |
| 11.8 | 16.5 | 30.5 |

The above figures comprise two tests which were run, utilizing different strains of mice (mixed sexes), thus accounting for the slight but not significantly different results obtained in these tests.

*Example 4*

Testing house mice and utilizing tetrakis laurylammino boronium chloride dissolved in isopropyl alcohol, under conditions similar to those in Example 1 except that cotton bags were used, weighing 3.25 pounds per square yard, the following test results were obtained:

| Concentration (milligrams per square inch) | Number of Mice Tested | Number Repelled |
|---|---|---|
| 1 | 10 | 0 |
| 1.78 | 20 | 3 |
| 2.29 | 10 | 3 |
| 3 | 10 | 5 |
| 5.62 | 20 | 5 |
| 10 | 7 | 7 |

The following data were derived:

$R_{50}$ ---------------- 4.0    $R_{90}$ ---------------- 13.4
$R_{80}$ ---------------- 8.8    $R_{98}$ ---------------- 27

*Example 5*

Tests were run on house mice, utilizing tetrakis laurylammino boronium chloride dissolved in isopropanol, as follows:

25 treated seeds were exposed with an individually caged test animal for a 16–18 hour test period. No other food was available during the test. Ten animals were tested at each concentration shown below. An animal was considered repelled when 13 or more treated seeds were uneaten. The following results were obtained:

| Percentage concentration on white wheat | Number Tested | Number Repelled |
|---|---|---|
| 0.1 | 10 | 2 |
| 0.178 | 10 | 3 |
| 0.3 | 10 | 7 |
| 1.0 | 10 | 10 |

The following values were obtained:

$R_{50}$ ---------------- 0.23    $R_{90}$ ---------------- 1.65
$R_{80}$ ---------------- 0.46    $R_{99}$ ---------------- 1.5

*Example 6*

Tests were run in the manner set forth in Example 5, utilizing different compounds, with the following results:

| Compound | Initial Activity (Percent Repelled) | $R^{50}$ |
|---|---|---|
| Tetrakis (laurylammino)-aluminum chloride | 100 | 0.11 |
| Tetrakis (laurylammino)-nickel chloride | 90 | 0.37 |
| Tetrakis (laurylammino)-zinc chloride | 90 | 0.44 |
| Tetrakis (laurylammino)-boronium chloride | 90 | 0.47 |
| Tetrakis (myristylammino)-boronium chloride | 80 | 0.55 |
| Tetrakis (2-ethylhexylammino)-boronium chloride | 89 | 0.70 |

*Example 7*

A series of horse stalls, major portions of which were composed of wood, had been chewed and eaten by horses. In the case of some stalls, it was found that horses tended to chew the wood on one side only, and in such cases that side was covered with 25 milligrams per square inch of tetrakis dodecylamine boronium chloride admixed with a polyethylene emulsion binder. In all of the stalls (more than twelve in number) the horses discontinued eating the side covered with the tetrakis dodecylamine boronium chloride and turned instead of the other side of the stall. Following this, the other side of the stall was covered with a barrier in the same manner as the side just mentioned above, with the result that the horses all completely discontinued their attack upon the wood.

The barrier was applied by simply painting on the wood, using a brush. No harm was done to any of the horses and the problem was successfully and completely solved.

From the foregoing examples it will be understood that the compounds in accordance with this invention cooperate with the barrier material to provide an easily utilized, inexpensive means for protecting a wide variety of commodities and properties from attack by rodents and other animals. Not only is the agent in accordance with this invention advantageous from the point of view of potency and cost, but it has the property of resisting leaching due to rainfall, which highly advantageous property nevertheless does not impede its excellent repellent characteristics. Moreover, the metals which are present in the complex potentiate the activity of the complex. Aluminum and nickel appear to be the most active of the metals covered herein.

Although this invention has been disclosed with reference to specific applications of the barrier, it will be appreciated that various modifications may be made without departing from the spirit and scope of this invention all as defined in the appended claims.

It is claimed:

1. In a method of rendering a locus resistant to attack by animals which are responsive to gustatory sensations, the steps comprising applying to the surface of said locus a compatible gustatory repellent consisting of tetrakis alkylamine metal halide, where the metal is selected from the group consisting of nickel, zinc, boron and aluminum, the alkyl group contains from 8 to 18 carbon atoms and the halide is selected from the group consisting of bromine and chlorine said halide being supplied in an effective amount for creating such gustatory sensation.

2. In a method of rendering a locus resistant to animals, characterized by their sensitivity to gustatory repellents, the steps comprising coating said locus with an aqueous dispersion consisting essentially of a polysacharide binder selected from the group consisting of starch, celloulose methyl ether, hydroxyethyl cellulose and carboxymethyl cellulose, and a gustatory repellent consisting of tetrakis alkylamine metal halide, where the metal is selected from the group consisting of nickel, zinc, boron and aluminum, the alkyl group contains from 8 to 18 carbon atoms and the halide is selected from the group consisting of bromine and chlorine.

3. In a method of rendering a location resistant to attack by animals, the steps which comprise interposing a gustatory repellent between such animals and such location, said repellent comprising an inert carrier containing therein, in a quantity to be effective for producing a repelling gustatory sensation in such animals, tetrakis alkylamine metal halide, wherein the metal is selected from the group consisting of nickel, zinc, boron and aluminum, said alkyl containing 8 to 18 carbon atoms, and the halide is selected from the group consisting of bromine and chlorine.

4. A method of repelling rodents from a locus comprising the steps of applying to said locus an effective amount of a compound having the formula $(RNH_2)_4MX_3$ wherein R is alkyl containing from 8 to 18 carbon atoms, M is a metal selected from the group consisting of nickel, zinc, boron and aluminum, and X is a halide chosen from the group consisting of bromine and chlorine said compound being present in a quantity to influence said rodents by gustatory sensation in a manner to cause them to be repelled from said location.

5. A method of repelling mice and horses from a locus comprising the steps of attaching to said locus between about 10 to about 100 milligrams per square inch of a compound having the formula $(RNH_2)_4MX_3$ wherein R is alkyl containing from 8 to 18 carbon atoms, M is a metal selected from the group consisting of nickel, zinc, boron and aluminum, and X is a halide chosen from the group consisting of bromine and chlorine.

6. A method of repelling mice from a locus comprising the steps of applying to said locus about 10 to about 100 milligrams per square inch of a compound having the formula $(RNH_2)_4MCl_3$ wherein R is alkyl containing from 8 to 18 carbon atoms, M is a metal selected from the group consisting of nickel, zinc, boron and aluminum.

References Cited by the Examiner

UNITED STATES PATENTS 2,655,524    10/1953    Sowa _____ 260—448

JULIAN S. LEVITT, *Primary Examiner.*

D. B. MOYER, VERA C. CLARKE,
*Assistant Examiners.*